(12) United States Patent
Lee et al.

(10) Patent No.: US 11,061,478 B2
(45) Date of Patent: *Jul. 13, 2021

(54) APPARATUS AND METHOD FOR PROVIDING HAPTIC FEEDBACK THROUGH WEARABLE DEVICE

(71) Applicant: Samsung Electronics Co., Ltd., Gyeonggi-do (KR)

(72) Inventors: Yong Gu Lee, Seoul (KR); Ji Won Kim, Seoul (KR); Young Hak Oh, Seoul (KR); Sun Young Yi, Gyeonggi-do (KR); Won Jun Lee, Gyeonggi-do (KR); Kyu Ok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,462

(22) Filed: Mar. 31, 2020

(65) Prior Publication Data

US 2020/0225755 A1   Jul. 16, 2020

Related U.S. Application Data

(63) Continuation of application No. 16/194,488, filed on Nov. 19, 2018, now Pat. No. 10,649,534.

(30) Foreign Application Priority Data

Nov. 17, 2017   (KR) .......................... 10-2017-0154142

(51) Int. Cl.
*G08B 6/00* (2006.01)
*G06F 3/01* (2006.01)
(Continued)

(52) U.S. Cl.
CPC .............. *G06F 3/016* (2013.01); *G06F 1/163* (2013.01); *G06F 1/1626* (2013.01);
(Continued)

(58) Field of Classification Search
CPC ...... G06F 3/016; G06F 3/014; G06F 3/04815; G06F 3/011; G06F 1/1698; G06F 1/1626;
(Continued)

(56) References Cited

U.S. PATENT DOCUMENTS 9,000,887 B2   4/2015   Linksy et al.
9,024,865 B2   5/2015   Linksy et al.
(Continued)

FOREIGN PATENT DOCUMENTS

WO   2011/011746 A1   1/2011

*Primary Examiner* — Toan N Pham
(74) *Attorney, Agent, or Firm* — Cha & Reiter, LLC

(57) ABSTRACT

An electronic device includes a communication circuit to communicate with at least one wearable device, and at least one processor electrically connected with the communication circuit. The at least one processor is configured to obtain position information on a position on which the at least one wearable device is placed on a user's body, and to transmit a control signal to the at least one wearable device through the communication circuit such that, when an output of a haptic pattern specified based on a function is requested, the at least one wearable device outputs a haptic feedback corresponding to the position information and the specified haptic pattern.

20 Claims, 11 Drawing Sheets

(51) Int. Cl.
  *G06F 1/16*      (2006.01)
  *G06F 3/0488*    (2013.01)
  *H04M 1/72412*   (2021.01)

(52) U.S. Cl.
  CPC ............ *G06F 1/1698* (2013.01); *G06F 3/011* (2013.01); *G08B 6/00* (2013.01); *G06F 3/0488* (2013.01); *H04M 1/72412* (2021.01)

(58) Field of Classification Search
  CPC ......... G06F 1/163; G06F 3/0488; G08B 6/00; H04M 1/72412
  See application file for complete search history.

(56) References Cited

U.S. PATENT DOCUMENTS

| | | |
|---|---|---|
| 9,030,404 B2 | 5/2015 | Linksy et al. |
| 9,671,826 B2 | 6/2017 | Levesque et al. |
| 10,061,387 B2 | 8/2018 | Toney et al. |
| 10,192,211 B2 | 1/2019 | Levesque et al. |
| 10,649,534 B2 * | 5/2020 | Lee .................. G06F 3/011 |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2012/0249409 A1 | 10/2012 | Toney et al. |
| 2013/0198625 A1 | 8/2013 | Anderson et al. |
| 2015/0145656 A1 | 5/2015 | Levesque et al. |
| 2017/0116827 A1 | 4/2017 | Clarke-Stone et al. |
| 2017/0178114 A1 | 6/2017 | Levesque et al. |
| 2018/0204426 A1 | 7/2018 | Nagisetty et al. |
| 2019/0139020 A1 | 5/2019 | Levesque et al. |
| 2019/0212824 A1 | 7/2019 | Keller et al. |

\* cited by examiner

APPARATUS AND METHOD FOR PROVIDING HAPTIC FEEDBACK THROUGH WEARABLE DEVICE

CROSS-REFERENCE TO RELATED APPLICATION(S)

This application is a Continuation of U.S. patent application Ser. No. 16/194,488 filed on Nov. 19, 2018, now U.S. Pat. No. 10,649,534, which is based on and claims priority under 35 U.S.C. § 119 to Korean Patent Application No. 10-2017-0154142, filed on Nov. 17, 2017, in the Korean Intellectual Property Office, the disclosure of which is incorporated by reference herein its entirety.

BACKGROUND

1. Field

The present disclosure generally relates to a technology of providing haptic feedback.

2. Description of Related Art

Recently, in addition to providing visual and audio content, electronic devices have been made with haptic effects for providing tactile feedback to the user. In particular, the increasing popularity of virtual reality (VR) content has necessitated haptic effects of various patterns so as to provide various tactile sensations to the user.

The above information is presented as background information only to assist with an understanding of the present disclosure. No determination has been made, and no assertion is made, as to whether any of the above might be applicable as prior art with regard to the present disclosure.

SUMMARY

Herein, in one embodiment, is disclosed an electronic device that may provide various haptic feedback patterns to various body parts of the user. The provided haptic patterns, which may vary in vibration frequency, vibration amplitude, time period of the vibration, etc., may be preset in association with content reproduced by the electronic device.

Wearable devices may be placed on various positions on the body of the user. For example, the wearable devices may be placed on various positions such as the wrist, the upper or lower arm, the shoulder, the neck, the waist, the chest, the head, the ankle, the sole of foot, the upper or lower portion of a leg, etc. The wearable devices placed on various positions of the body may include, for example, a smart watch, smart glasses, a wrist band, a piece of smart clothing, a device fitted in a shoe, or the like.

Aspects of the present disclosure are to address at least the above-mentioned problems and/or disadvantages and to provide at least the advantages described below. Accordingly, an aspect of the present disclosure is to provide an apparatus and a method for providing proper haptic feedback to specific body parts of the user using wearable devices.

In addition, an aspect of the present disclosure is to provide an apparatus and a method for providing a specific haptic feedback depending on a vibration characteristic of a wearable device to a body part of the user.

In accordance with an aspect of the present disclosure, an electronic device may include a communication circuit to communicate with at least one wearable device, and at least one processor electrically connected with the communication circuit. The at least one processor may be configured to obtain position information on a position on which the at least one wearable device is placed on a user's body, and to transmit a control signal to the at least one wearable device through the communication circuit such that, when an output of a haptic pattern specified based on a function is requested, the at least one wearable device outputs a haptic feedback corresponding to the position information and the specified haptic pattern.

In accordance with another aspect of the present disclosure, a method performed by an electronic device may include identifying at least one wearable device connected with the electronic device, obtaining position information on a position on which the at least one wearable device is placed on a user's body, and transmitting a control signal to the at least one wearable device such that, when an output of a haptic pattern specified based on a function is requested, the at least one wearable device outputs a haptic feedback corresponding to the position information and the specified haptic pattern.

As described above, according to embodiments of the present disclosure, the electronic device may output various haptic feedback depending on positions on which the wearable devices are placed, thereby outputting haptic feedback optimized for each body part of the user.

In addition, the electronic device outputs haptic feedback optimized based on vibration characteristic of each wearable device and the position where each wearable device is placed, thereby improving tactile feedback to the user.

In addition, a variety of other properties may be understood directly or indirectly through the present disclosure.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
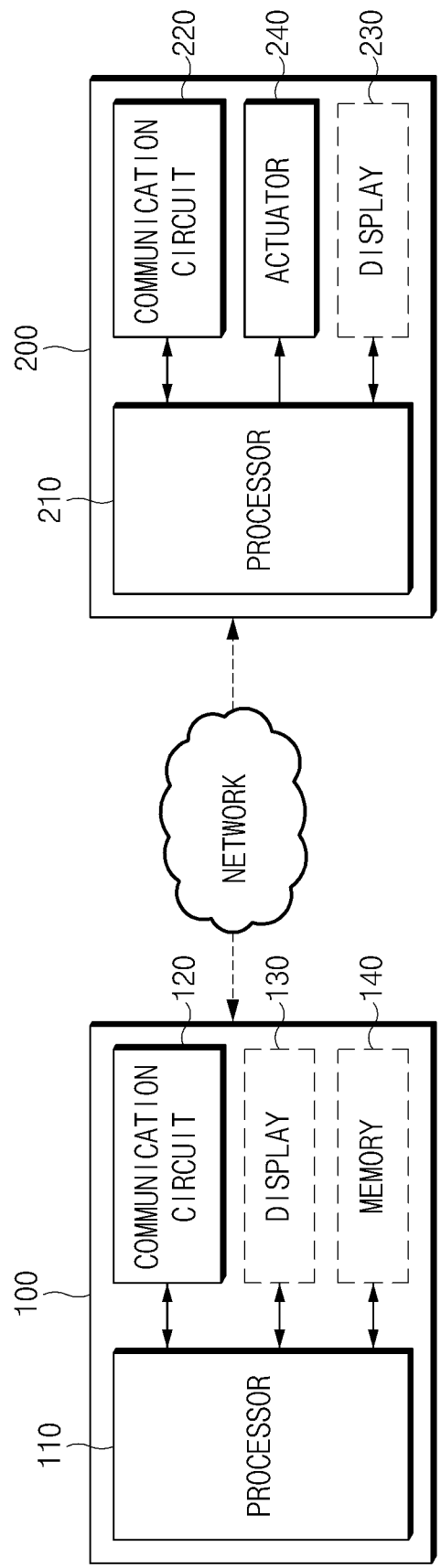
FIG. 1 is a block diagram illustrating an electronic device and a wearable device, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have," "may have," "include," "comprise," "may include," and "may comprise" used herein indicate existence of corresponding features (e.g., components such as numeric values, functions, operations, or parts) but do not exclude presence of additional features.

In the present disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a block diagram illustrating an electronic device and a wearable device, according to an embodiment.

Referring to FIG. 1, according to an embodiment, an electronic device 100 may include at least one processor 110 and a communication circuit 120 electrically connected with the at least one processor 110. The processor 110 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the electronic device 100 may be referred to as a smart phone, a table personal computer (PC), a PC computer, or the like. Referring to FIG. 1, although the electronic device 100 is exemplified as a smartphone herein, the present disclosure is not limited thereto. For example, in another embodiment, the electronic device 100 may be a wearable device. The at least one processor 110 may include an application processor (AP), a central processing unit (CPU), a communication processor (CP), or the like.

According to an embodiment, the electronic device 100 may be coupled to a wearable device 200, thereby directly controlling the wearable device 200.

According to an embodiment, the communication circuit 120 may be configured to communicate with at least one wearable device 200. The electronic device 100 may form a communication channel with the wearable device 200 through the communication circuit 120 to be connected with the wearable device 200 either via a wire or wirelessly. The electronic device 100 may transmit control signals, data, or the like to the wearable device 200 through the communication circuit 120.

According to an embodiment, the wearable device 200 may include a processor 210, a communication circuit 220, and an actuator 240. Additionally or alternatively, the wearable device 200 may further include a display 230 to provide, for example, visual user interfaces related to haptic feedback. The processor 210 of the wearable device 200 may communicate with the electronic device 100 through the communication circuit 220. The processor 210 may also drive the actuator 240, thereby outputting haptic feedback having a specific pattern.

According to an embodiment, the electronic device 100 may generate a control signal for controlling the wearable device 200 based on the position where the wearable device 200 is placed, and/or information regarding the actuator 240, such as vibration characteristic of the actuator 240, whether the actuator 240 is a linear resonance actuator (LRA), an eccentric rotating mass (ERM) vibration motor, a DC motor, etc. The control signal may then be transmitted to the wearable device 200 so that the wearable device 200 outputs haptic feedback having a specific haptic pattern. The wearable device 200 may then output the haptic feedback having the specific haptic pattern in response to receiving the control signal.

In another example, the electronic device 100 may determine a haptic pattern corresponding to content reproduced or executed and may change the determined haptic pattern into the form (e.g., by changing at least one of amplitude and frequency of the haptic pattern) corresponding to at least one of the position of the wearable device 200 on the user's body and the vibration characteristic of the wearable device 200, such as the type and size of the actuator 240. The electronic device 100 may transmit a control signal corresponding to the changed haptic pattern to the wearable device 200 and the wearable device 200 may output haptic feedback in response to the control signal.

According to an embodiment, the wearable device 200 may operate as a haptic feedback device for the electronic device 100. In this case, the wearable device 200 may disable other operations or functions, for example phone call function, alarm function, biometric sensor signal collecting function, or the like.

According to an embodiment, the electronic device 100 may further include a display 130 and a memory 140. For example, the electronic device 100 may provide several interfaces, which are to be described with reference to FIGS. 5 to 7, through the display 130. The electronic device 100 may store, in the memory 140, data required to generate the control signal to be transmitted to the wearable device 200.

Figure 2A:
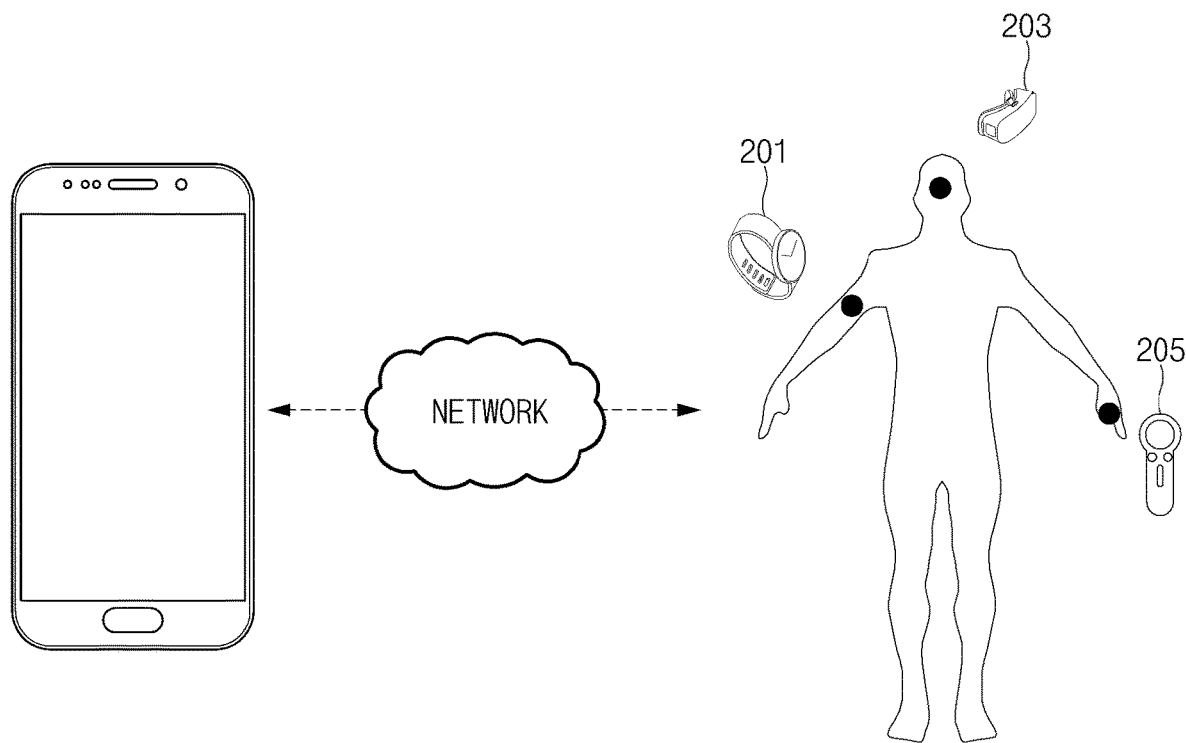
FIG. 2A and FIG. 2B illustrate an operating environment of the electronic device, according to an embodiment.
Figure 2B:
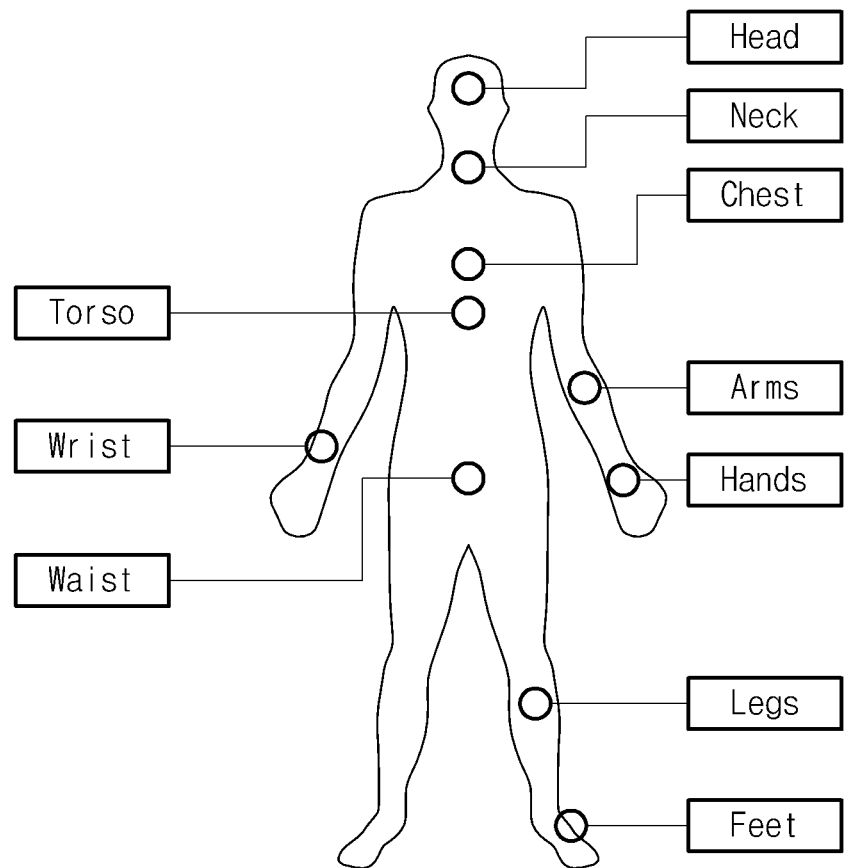

FIGS. 2A and 2B illustrate an operating environment of the electronic device, according to an embodiment.

According to an embodiment, at least one processor 110 may identify at least one wearable device 200 connected with the electronic device 100. The electronic device 100 may obtain information on the position on the user's body where the at least one wearable device 200 is placed (wearing position).

For example, the information on the position where the wearable device 200 is placed may be referred to as information of a body part of the user where the wearable device 200 is positioned. Referring to FIG. 2B, the wearable device 200 may be put on the head, the neck, the wrist, the chest, the waist, the arm, the hand, the leg, the foot, etc., of the user.

According to an embodiment, an output for a specified haptic pattern may be requested for a particular various function that is executed by the electronic device 100. For example, the specified haptic pattern may correspond to specific content (e.g., images, games, VR content, or the like) reproduced or executed by the electronic device 100. The specified haptic pattern may include information on a part of the body that will receive the haptic pattern, intensity of the vibration, period of the vibration, duration of the vibration etc. The haptic pattern may be previously associated with the content so as to enrich user experience.

According to an embodiment, if the output of the specified haptic pattern is requested as at least one function is executed, the electronic device 100 may control the wearable device 200 such that the wearable device 200 outputs haptic feedback corresponding to the specified haptic pattern. For example, the electronic device 100 may generate a control signal corresponding to the specified haptic pattern and the position where the wearable device is placed and may transmit the control signal to the wearable device 200. The wearable device 200 may output the haptic feedback corresponding to the control signal.

According to an embodiment, the specified haptic pattern may include a position list of the positions where the haptic feedback occurs. For example, the position list may include a plurality of target positions for producing a haptic effect. The electronic device 100 may select the wearable device 200 among various wearable devices based on a particular target position in the position list.

According to an embodiment, even if the same haptic pattern is specified, different haptic feedback may be output depending on where the wearable device 200 is located. That is, the specified haptic pattern may be altered depending on the position on which the wearable device 200 is placed. For example, the electronic device 100 may obtain a setting value for altering the specified haptic pattern based on the wearing position of the wearable device. Then, the electronic device 100 may generate the control signal based on the obtained setting value. The setting value may, for example, be previously stored in the electronic device 100 or received from an external device (e.g. a server).

Referring to FIG. 2A, by way of example, the electronic device 100 is connected with a first device 201 placed on a left arm, a second device 203 placed on the head, and a third device 205 placed on a right hand. The electronic device 100 may identify the first to third devices 201 to 205 when they are connected with the electronic device 100. The electronic device 100 may obtain "the left arm" as position information of the first device 201, "the head" as position information of the second device 203, and "the right hand" as position information of the third device 205.

In one example, as a function (e.g. VR function) of the electronic device 100 is executed, output of a haptic pattern having the same vibration intensity may be requested with respect to the first device 201 to the third device 205. But the electronic device 100 may control the first device 201 to the third device 205 to output different haptic feedback based on the positions of the wearable devices. For example, the electronic device 100 may cause the second device 203 to output vibration having the weakest intensity, because it is placed on the head of the user. That is, due to sensitivities in the head region of the user, to provide tactile sensation of the same intensity as feedback to another part of the body, haptic feedback provided to the head of the user may have to be weaker.

If output of the haptic pattern is requested only with respect to the hand and the arm, on the other hand, the electronic device 100 may transmit control signals only to the first device 201 and the third device 205. Accordingly, a particular tactile effect may be transmitted to only some body parts by the electronic device 100.

Figure 3A:
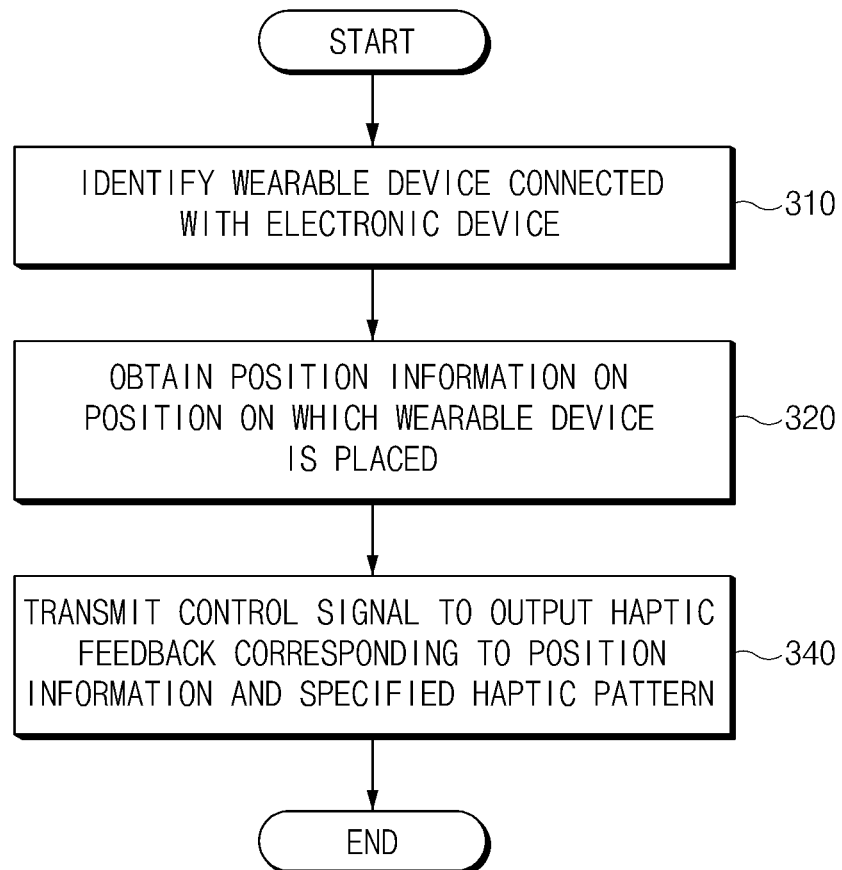
FIG. 3A is a flowchart illustrating a haptic operating method for an electronic device depending on positions of the wearable devices, according to an embodiment.
Figure 3B:
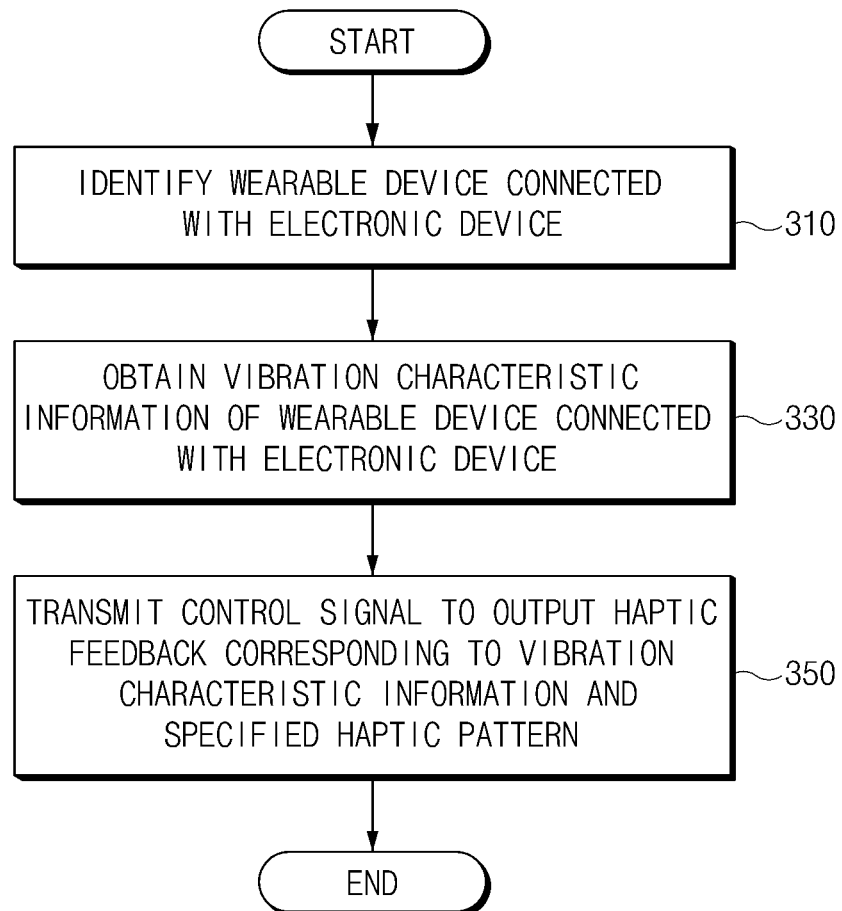
FIG. 3B is a flowchart illustrating a haptic operating method for an electronic device depending on vibration characteristics of the wearable devices, according to an embodiment.

FIG. 3A is a flowchart illustrating a haptic operating method for the electronic device depending on positions of the wearable devices, according to an embodiment. FIG. 3B is a flowchart illustrating a haptic operating method for the electronic device depending on vibration characteristics of the wearable devices, according to an embodiment.

Referring to FIGS. 3A and 3B, according to an embodiment, the method for controlling the wearable device 200 may include operation 310 to operation 350. Operation 310 to operation 350 may be performed by the electronic device 100 illustrated in FIG. 1. Each of the operations 310 to 350 may be implemented with instructions being able to be performed (or executed) by the processor 110 of the electronic device 100. The instructions may be stored, for example, in a computer-recording medium or the memory 140 of the electronic device 100 illustrated in FIG. 1. In the following description of operations 310 to 350, reference numerals of FIG. 1 are used and descriptions duplicative of those of FIG. 1 will be omitted in order to avoid redundancy.

In operation 310, the electronic device 100 may identify at least one wearable device 200 connected with the electronic device 100. For example, the electronic device 100 may search for and identify the wearable device 200 so that the wearable device 200 is connected with the electronic device 100 for providing haptic output.

In operation 320, the electronic device 100 may obtain information on the position on which the wearable device 200 is placed. If output for a specified haptic pattern is requested as a particular function is executed in the electronic device 100, in operation 340, the electronic device 100 may transmit a control signal to the wearable device 200 such that the wearable device 200 outputs haptic feedback corresponding to the position information and the specified haptic pattern. The descriptions of operation 320 and 340 have been described with reference to FIGS. 2A and 2B.

In operation 330, the electronic device 100 may obtain vibration characteristic information output by the actuator 240 included in the wearable device 200, which is connected with the electronic device 100. In operation 350, the electronic device 100 may transmit a control signal to the wearable device 200 such that the wearable device 200 outputs haptic feedback corresponding to the vibration characteristic information and the specified haptic pattern. For example, the vibration characteristic information may include information on the types of haptic pattern that may be outputted by the actuator 240 based on hardware characteristics of the actuator 240.

According to an embodiment, even if the same haptic pattern is specified, different haptic feedback may be outputted depending on the characteristics of the actuator 240. The frequency band or the reactive speed of the haptic feedback may be different depending on the types of actuators 240. For example, a linear resonant actuator (LRA) may output haptic feedback with shorter periods as compared to a direct current (DC) actuator.

The electronic device 100 may change the specified haptic pattern to a haptic pattern which is able to be outputted by the actuator 240. The electronic device 100 may generate a control signal corresponding to the changed haptic pattern and may transmit the control signal to the wearable device 200.

For example, the electronic device 100 may generate a control signal by using change information for changing the specified haptic pattern such that the specified haptic pattern is differently output depending on the vibration characteristic of the actuator 240. For example, the change information may be stored in the memory 140 of the electronic device 100. In addition, the change information may be received from an external device (e.g., a server).

According to an embodiment, operation 320 and operation 330 may be simultaneously performed. That is, the electronic device 100 may simultaneously process the specified haptic pattern, the position of the wearable device 200, and the vibration characteristic of the wearable device 200. The position information and the vibration characteristic information of the wearable device 200 may be obtained from the wearable device 200. Using the position information and the vibration characteristic information, the electronic device 100 may generate haptic feedback suitable for the position of the wearable device 200 and suitable for the actuator 240. The electronic device 100 may transmit the control signal to the wearable device 200 such that the wearable device 200 outputs the haptic feedback corresponding to the position information, the specified haptic pattern, and the vibration characteristic information.

For example, the electronic device 100 may change the specified haptic pattern, based on the position of the wearable device 200 and/or the characteristic of the actuator 240. Thus, the electronic device 100 can dynamically alter the specified haptic pattern so that proper haptic feedback can be outputted by the wearable device 200 even if different devices with different vibration characteristic are used as the wearable device 200.

Figure 4:
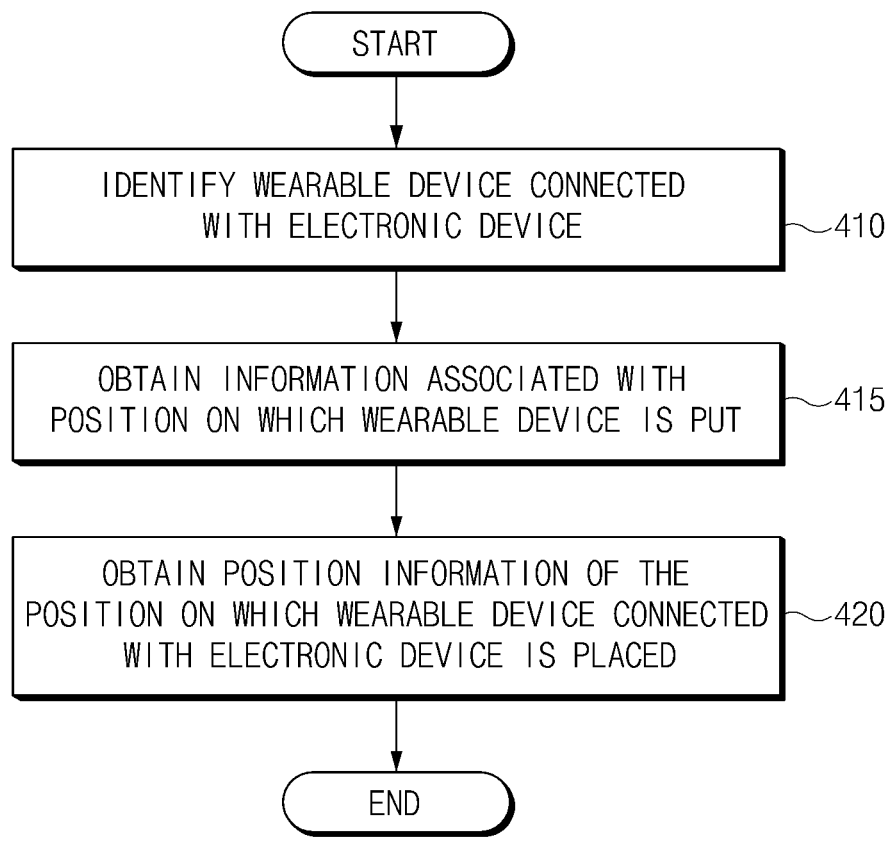
FIG. 4 is a flowchart illustrating a method for obtaining position information of a wearable device, according to an embodiment.

FIG. 4 is a flowchart illustrating a method for obtaining position information of a wearable device, according to an embodiment.

Referring to FIG. 4, according to an embodiment, the method for obtaining the position information of a wearable device may include operation 410 through operation 420. Operation 410 through operation 420 may be performed by the electronic device 100 illustrated in FIG. 1. Each of operation 410 and operation 420 may be implemented with instructions being able to be performed (or executed) by the processor 110 of the electronic device 100. Hereinafter, reference numerals of FIG. 1 may be employed in the description made with reference of FIG. 4.

Operation 410 may correspond to operation 310 of FIG. 3A and FIG. 3B. The duplicative description thereof will be omitted.

In operation 415, the electronic device 100 may obtain information associated with the position on the user's body where the wearable device 200 is placed. In operation 420, the electronic device 100 may determine the position of the wearable device 200 based on the obtained associated information, thereby obtaining the position information.

According to an embodiment, the associated information of operation 415 may be motion information of the wearable device 200. The electronic device 100 may obtain position information based on the motion information.

In another example, the electronic device 100 may determine the position of the wearable device 200 based on data obtained through a sensor (e.g., a gyro sensor) of the wearable device 200. The data may include a direction in which the wearable device 200 moves, or the like.

For example, the movement data corresponding to a body part wearing the wearable device and a wearing direction (leftward or rightward) may be previously computed. The electronic device 100 may store the previously computed movement data in the memory 140 or may receive the previously computed movement data from an external device (e.g. a server). The electronic device 100 may compare the previously computed movement data with movement information obtained from the wearable device 200, thereby determining the position of the wearable device 200.

According to an embodiment, the associated information of operation 415 may be user input. The electronic device 100 may obtain the position information based on the input. For example, the electronic device 100 may directly receive an input stating that, for example, the wearable device 200 is placed on the left arm of the user.

According to an embodiment, the associated information of operation 415 may include information on the type of the wearable device 200. For example, the information on the type of the wearable device 200 may be received from the wearable device 200 and may be stored in the memory 140 of the electronic device 100. The electronic device 100 may obtain the position information based on the type of the wearable device 200. For example, when the wearable device 200 is a head-mount device, the electronic device 100 may determine that the wearable device 200 is positioned on the head of the user 50.

According to an embodiment, the electronic device 100 may obtain the position information by using a biometric sensor mounted in the wearable device 200 and bio information obtained from the biometric sensor.

For example, the electronic device 100 may determine the wearing position based on the type of sensor mounted in the wearable device 200. The wearable device 200 including a fingerprint sensor may be determined as being placed on a finger of the user. The wearable device 200 including an iris sensor may be determined as being placed on the face of the user. The wearable device 200 including a heart rate sensor may be determined as being put on a wrist of the user.

For example, the electronic device 100 may obtain position information by using bio information obtained from the mounted sensor. When the fingerprint information is obtained, the wearable device 200 may be determined as being put on the finger. When the heart rate information is obtained, the wearable device 200 may be determined as being put on the wrist.

According to an embodiment, the electronic device 100 may obtain the position information based on the combination of information related to the biometric sensor and the movement information.

For example, when the electronic device 100 obtains information on the heart rate of the user, the electronic device 100 may determine the wearable device 200 as being placed on the wrist of the user. Based on movement data, the electronic device 100 may determine whether the wearable device 200 is placed on the right wrist or the left wrist. Thus, the electronic device 100 may determine the position on which the wearable device 200 is placed by using a combination of biometric information and the movement information.

Figure 5:
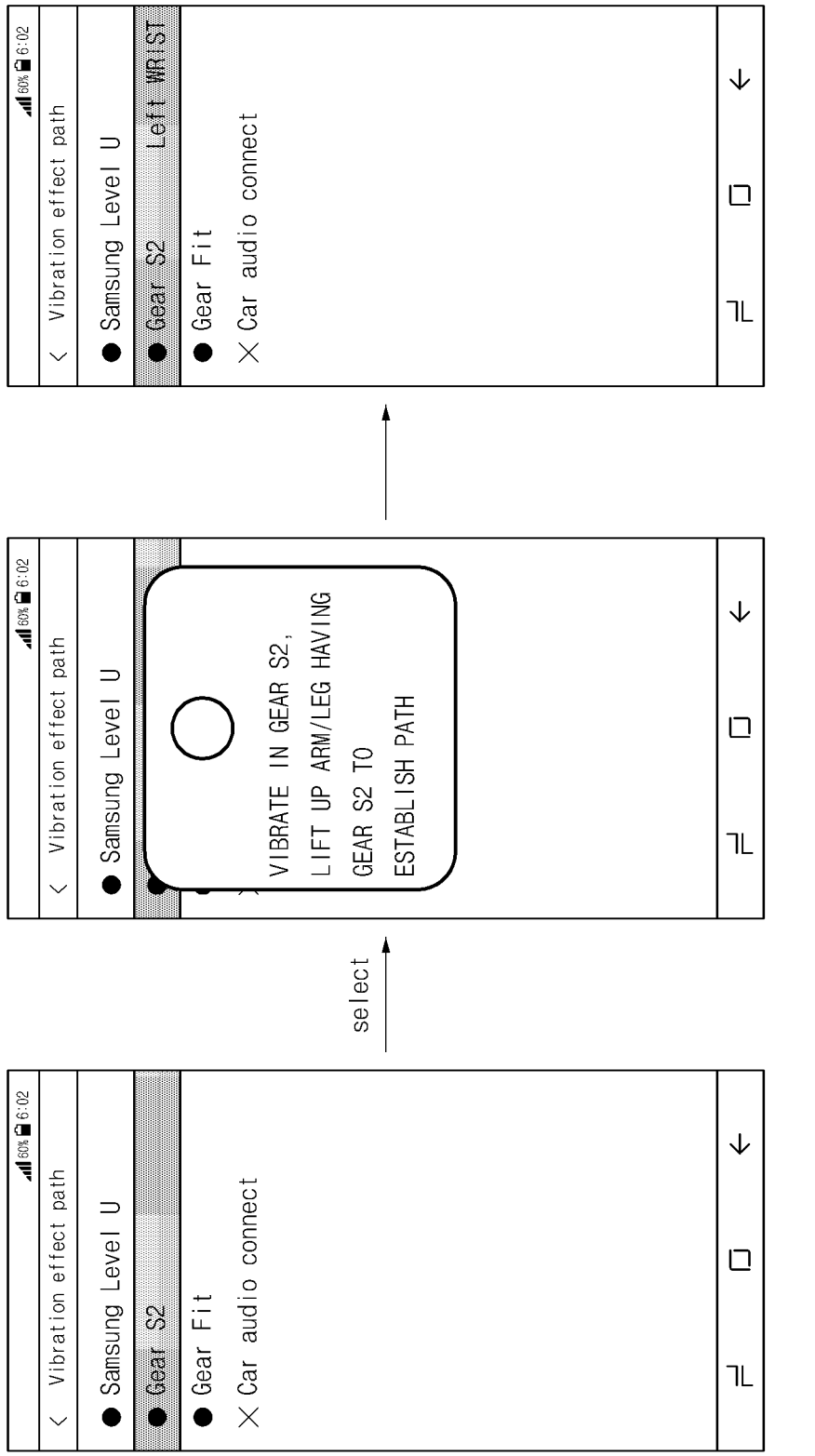
FIG. 5 is a view illustrating an interface to obtain motion information of the wearable device, according to an embodiment.

FIG. 5 is a view illustrating an interface to obtain motion information of the wearable device, according to an embodiment.

According to an embodiment, the electronic device 100 may output a screen for inducing movement of the wearable device 200 through the display 130 of the electronic device 100 or the display 230 of the wearable device 200. The electronic device 100 may determine the position of the wearable device 200 by using movement information obtained.

Referring to FIG. 5, the electronic device 100 may display the list of wearable devices 200 connected with the electronic device 100 as illustrated through screen 510. Screen 520 includes one example of guide information for inducing the movement of the wearable device 200. The determined position of the wearable device 200 is displayed on a screen 530.

Referring to the screen 520, the movement of the wearable device 200 by the user 50 is induced by a pop-up message "lift up" for the device "Gear S2." Thus, if a specific wearable device 200 is selected from the list of the screen 510, the pop-up message may be displayed on the screen 520 to induce the movement associated with the specific wearable device 200.

According to another embodiment, the electronic device 100 may output an audio signal for inducing the movement of the wearable device 200. For example, the electronic device 100 may output, as the audio signal, a message for inducing the movement, thereby inducing the movement of the wearable device 200 by the user 50. The audio signal may be repeatedly output until sensor signal related to movement is sufficiently collected. In addition, when the sensor signal is sufficiently collected, the electronic device 100 may output an audio signal to stop the user from moving.

According to an embodiment, the electronic device 100 may output the list of a plurality of wearable devices 200 connected with the electronic device 100 through the display 130 or the display 230 of the wearable device 200. The electronic device 100 may obtain position information of the wearable device 200 selected from the list.

Referring to screen 510, the list of the wearable devices 200 connected with the electronic device 100 is displayed. A user input may be received in relation to the selection of the wearable device 200. For example, the device "Gear S2" may be selected from the list. The electronic device 100 may obtain the position information of only the "Gear S2" device. The wearable device 200 to be used as a haptic feedback device based on functions executed by the electronic device 100 may be selected from the plurality of wearable devices 200.

Figure 6:
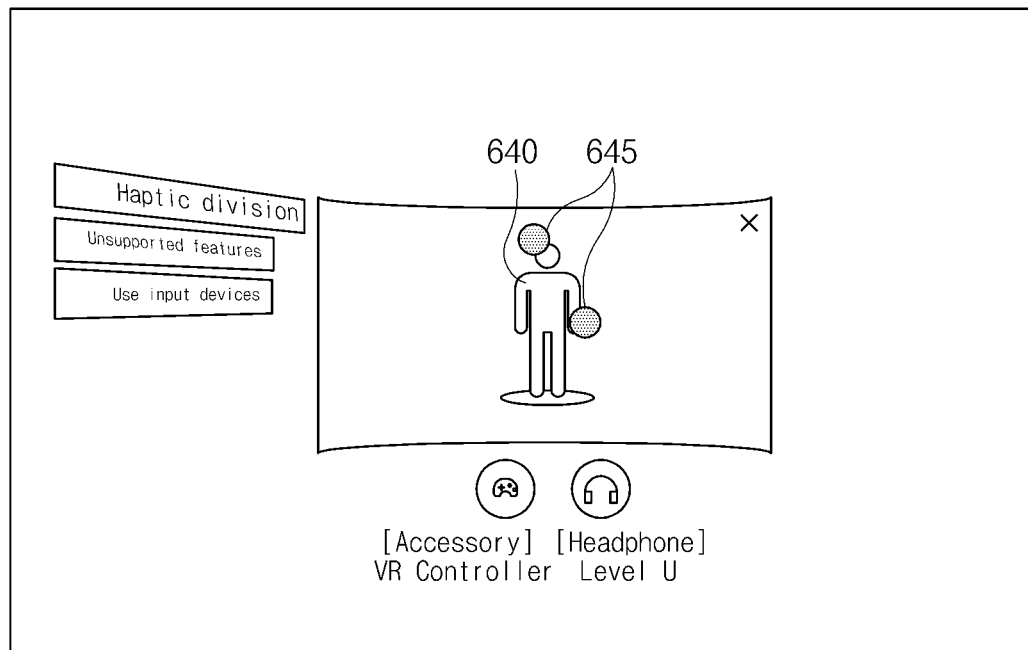
FIG. 6 is a view illustrating an interface to obtain position information of the wearable device, according to an embodiment.

FIG. 6 is a view illustrating an interface to obtain position information of the wearable device, according to an embodiment.

According to an embodiment, the electronic device 100 may output user interface screens through the display 130 of the electronic device 100 or the display 230 of the wearable device 200 to obtain a user input by the user 50. The electronic device 100 may determine the position of the wearable device 200 based on the user input.

Referring to FIG. 6, a screen 610 displays a picture 640 having the shape of a body. For example, the electronic device 100 may obtain the user input for the position of the wearable device 200 by using the picture 640. The electronic device 100 may determine the wearable device 200 as being positioned on the body of the user 50 corresponding to a position 645 selected on the picture 640.

The display 130 of the electronic device 100 or the display 230 of the wearable device 200, which outputs the screen 610, may be a touch screen display. In this case, the electronic device 100 may obtain touch inputs to the display 130 or 230 as the selected input.

In another example, the electronic device 100 may obtain the user input based on a voice command of the user 50. For example, when the user 50 utters "Neck," the electronic device 100 may determine that a corresponding wearable device 200 is positioned on the neck of the user 50.

According to an embodiment, an event may occur to request for the output of a haptic pattern corresponding to VR content outputted or executed by the electronic device 100. The electronic device 100 may utilize the wearable device 200 connected with the electronic device 100 as a haptic feedback receiver to output haptic feedback. For example, the electronic device 100 may display an interface to obtain position information of the wearable device 200 as illustrated in the screen 610, and may obtain position information. In addition, the electronic device 100 may obtain vibration characteristic information of the wearable device 200. The electronic device 100 may change the haptic pattern to be outputted based on the position information and the vibration characteristic information and may generate a control signal corresponding to the changed haptic pattern. The wearable device 200 may output the haptic feedback having the changed haptic pattern in response to the control signal. For example, when the electronic device 100 outputs the VR content, the screen 610 may be displayed in 3D on the electronic device 100 or on the display of the wearable device 200 connected with the electronic device 100.

Figure 7:
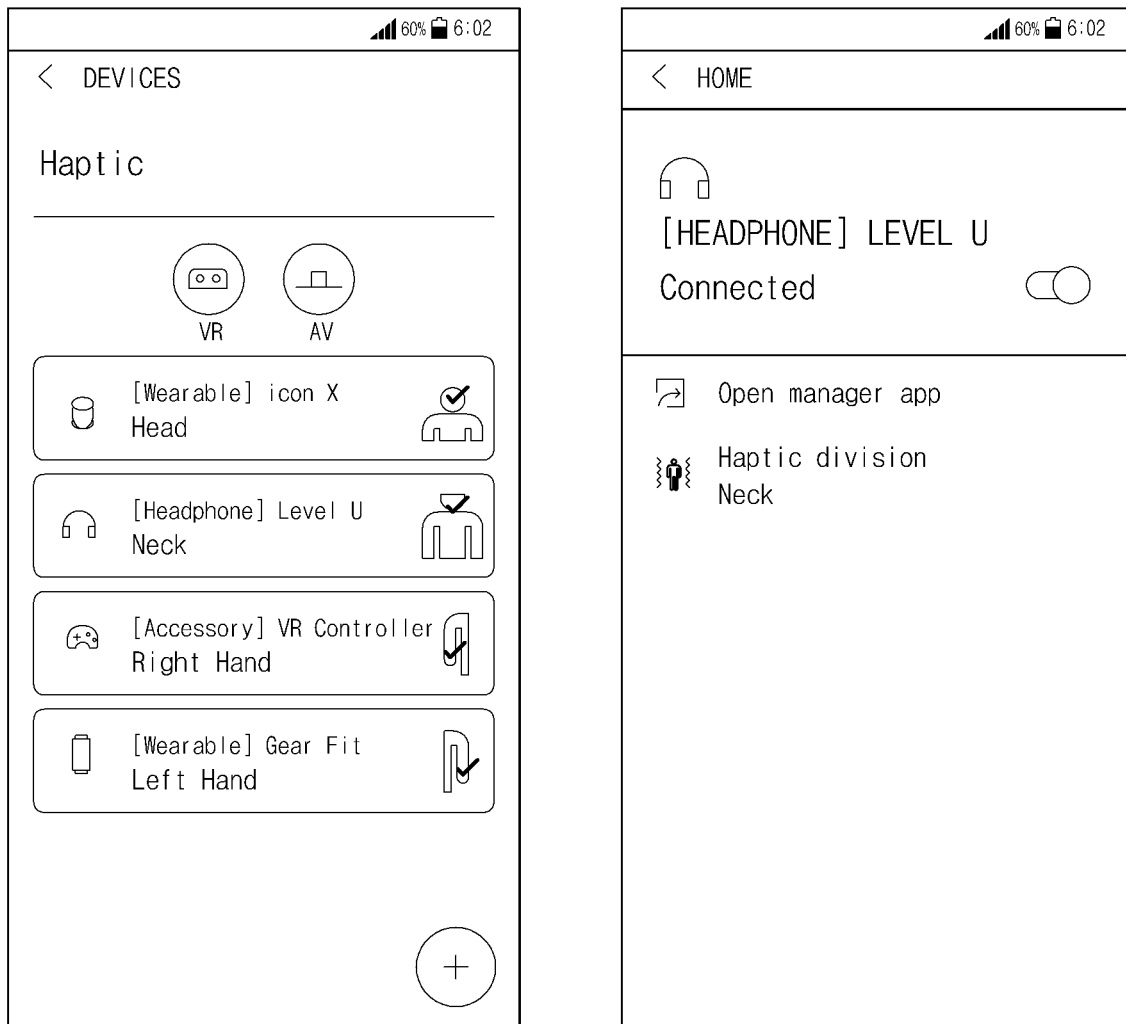
FIG. 7 is a view illustrating an interface to manage the wearable device, according to an embodiment.

FIG. 7 is a view illustrating an interface to manage the wearable device, according to an embodiment.

According to an embodiment, the electronic device 100 may output the list of at least one wearable device 200 connected with the electronic device 100 and position information of the wearable device 200 through the display 130 of the electronic device 100 or the display 230 of the wearable device 200. For example, a screen for displaying the list of the wearable device 200 and the position information of the wearable device 200 may be referred as an interface for managing the wearable device 200.

For example, the electronic device 100 may output an interface for displaying both the list of at least one wearable device 200 connected with the electronic device 100 and the wearing position of the wearable device 200. A user may recognize the types and the number of wearable devices 200 to be utilized as haptic feedback receivers through the interface. Referring to a screen 710, in one example, four wearable devices 200 are connected with the electronic device 100 and position information of the wearable devices 200 are displayed. The user 50 may recognize and manage the connection state of the wearable device 200 and the detected position information through the screen 710. For example, when a specific wearable device 200 is selected from the screen 710, a screen for the details of the specific wearable device 200 may be displayed, such as the one shown in screen 720. For example, the state of the connection to the headphone may be set through the screen 720.

Figure 8:
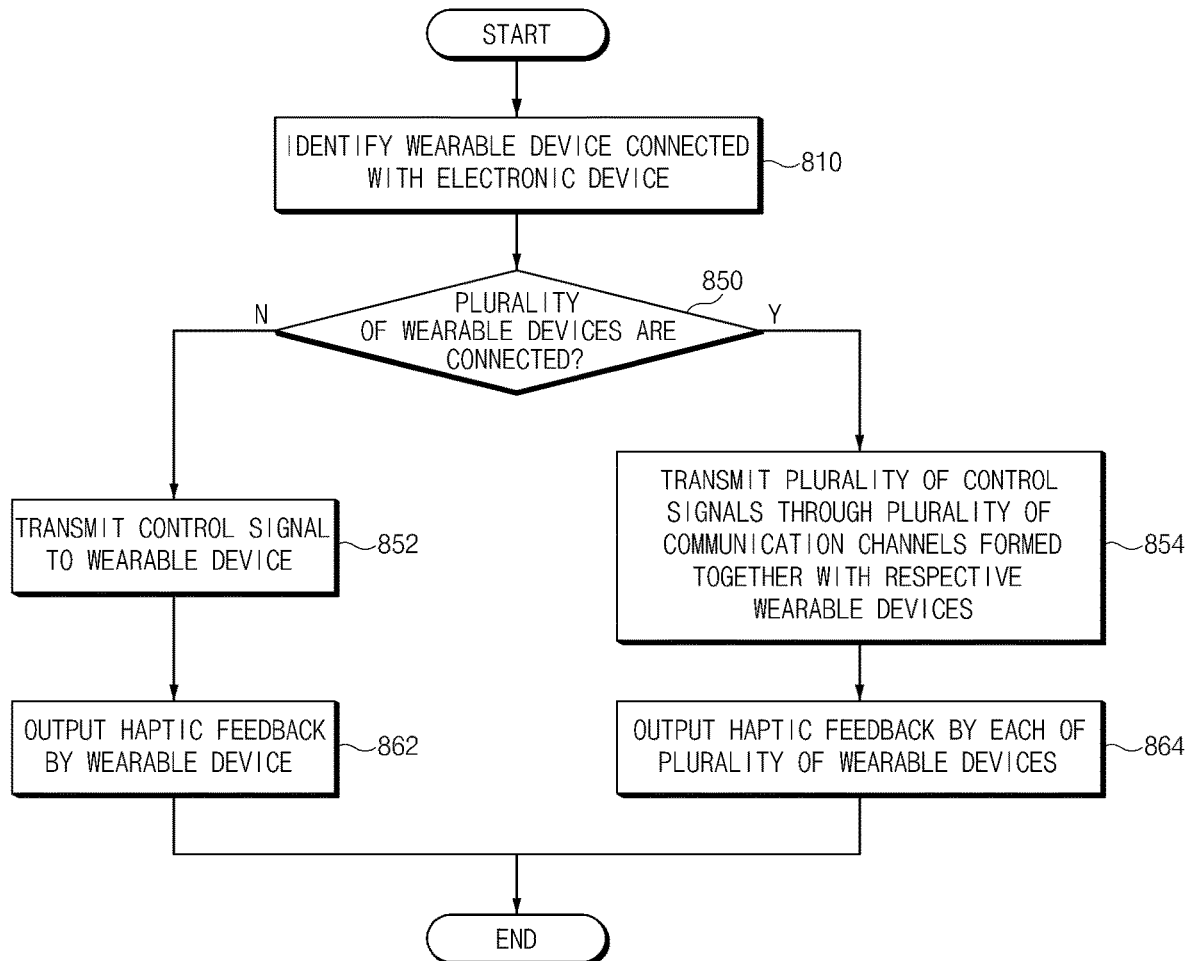
FIG. 8 is a flowchart illustrating a haptic operating method depending on the number of wearable devices, according to an embodiment.

FIG. 8 is a flowchart illustrating a haptic operating method based on the number of wearable devices, according to an embodiment.

Referring to FIG. 8, according to an embodiment, a method for controlling a wearable device may include operation 810 to operation 864. For example, operation 810 to operation 864 may be performed by the electronic device 100 illustrated in FIG. 1. Each of the operations 810 to 864 may be implemented with instructions being able to be performed (or executed) by the processor 110 of the electronic device 100. Hereinafter, reference numerals of FIG. 1 may be employed in the description made with reference of FIG. 8.

Operation 810 may correspond to operation 310 of FIGS. 3A and 3B. The duplicative description thereof will be omitted in the following description.

The electronic device 100 determines whether a plurality of wearable devices 200 are provided. When one wearable device 200 is provided, the electronic device 100 may transmit a control signal to the wearable device 200 connected with the electronic device 100 in operation 852 and the wearable device 200 receiving the control signal may output a haptic feedback corresponding to the control signal in operation 862.

When a plurality of wearable devices 200 are connected with the electronic device 100, the electronic device 100 may transmit a plurality of control signals through a plurality of communication channels formed with the wearable devices 200, in operation 854. In operation 864, the wearable devices 200 may each output different haptic feedbacks corresponding to the different control signals.

In embodiments associated with operation 854 and operation 864, the plurality of wearable devices 200 may include a first device and a second device, which are different from each other. The communication circuit 120 of the electronic device 100 may form a first communication channel with the first device, and may form a second communication channel with the second device. Thus, the electronic device 100 may form separate communication channels with the wearable devices 200.

The electronic device 100 may obtain information on a first position, on which the first device is placed, and information on a second position on which the second device is placed.

According to an embodiment, the electronic device 100 may generate a first control signal corresponding to a first haptic feedback that in turn corresponds to a haptic pattern specified based on the first position information. The electronic device 100 may generate a second control signal corresponding to a second haptic feedback that in turn corresponds to a haptic pattern specified based on the second position information. Both the first control signal and the second control signal may correspond to a particular function (e.g. VR function) currently executing in the electronic device 100.

According to an embodiment, the electronic device 100 may transmit the first control signal to the first device through the first communication channel, and may transmit the second control signal to the second device through the second communication channel. Alternatively, the electronic device 100 may transmit a multiple control signals to all of the wearable devices 200, and each of the wearable devices 200 will extract the control signal corresponding to it from the multiple control signals. Thus, the wearable devices 200 may output different haptic feedbacks having different patterns.

According to an embodiment, the electronic device 100 may further take into consideration characteristics of actuators 240 included in the plurality of wearable devices 200. The electronic device 100 may obtain first vibration characteristic information output by an actuator included in the first device and second vibration characteristic information output by an actuator included in the second device.

According to an embodiment, the electronic device 100 may generate a first control signal corresponding to a first haptic feedback based on the haptic pattern specified, the first position information, and the first vibration characteristic information. The electronic device 100 may generate a second control signal corresponding to a second haptic feedback based on the haptic pattern specified, the second position information, and the second vibration characteristic information. The first control signal may be transmitted to the first device through the first communication channel, and the second control signal may be transmitted to the second device through the second communication channel.

Figure 9:
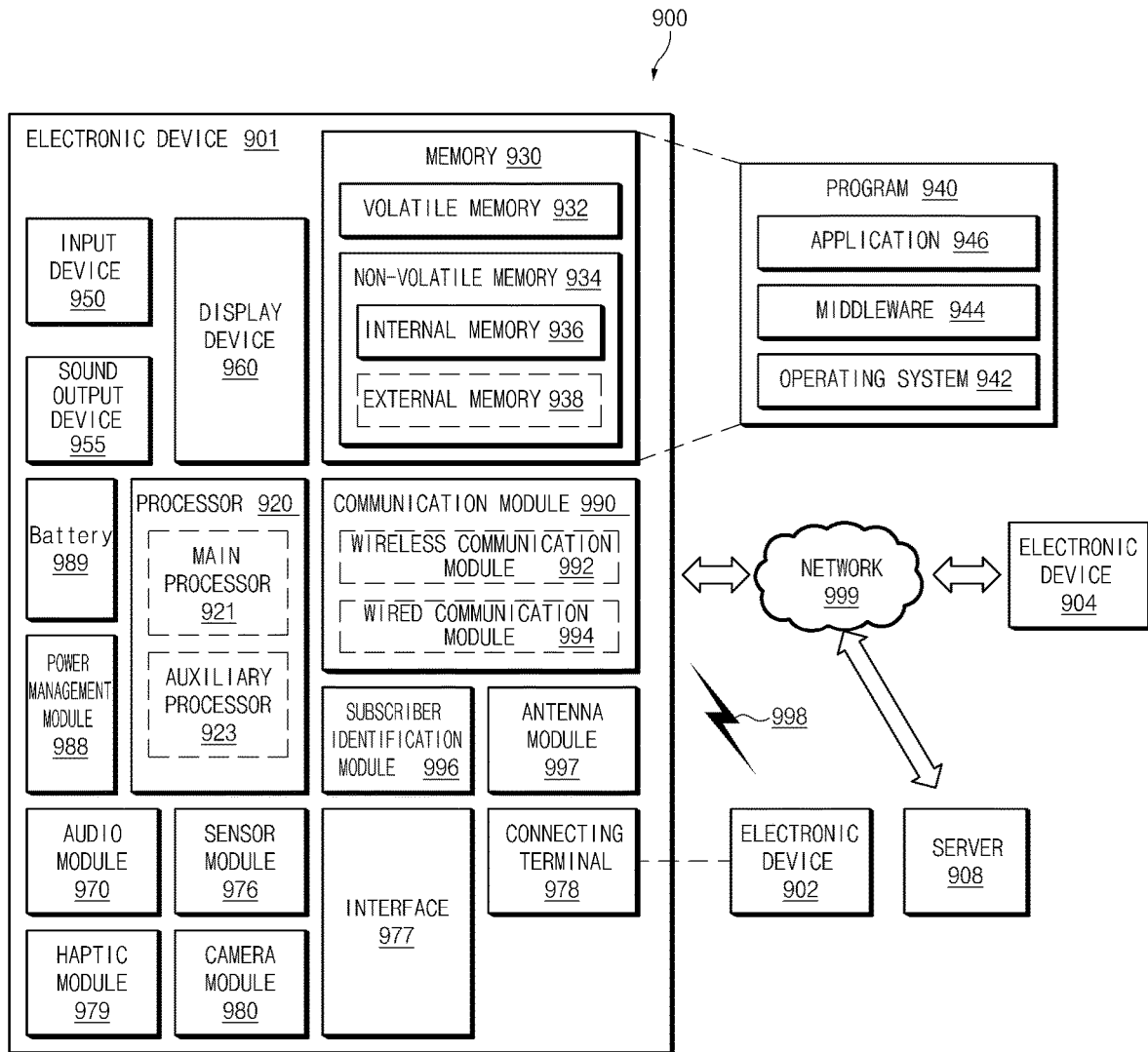
FIG. 9 is a block diagram of an electronic device in a network environment according to various embodiments.

FIG. 9 is a block diagram of an electronic device in a network environment according to various embodiments.

Referring to FIG. 9, an electronic device 901 may communicate with an electronic device 902 through a first network 998 (e.g., a short-range wireless communication) or may communicate with an electronic device 904 or a server 908 through a second network 999 (e.g., a long-distance wireless communication) in a network environment 900. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, and an antenna module 997. According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may operate, for example, software (e.g., a program 940) to control at least one of other components (e.g., a hardware or software component) of the electronic device 901 connected to the processor 920 and may process and compute a variety of data. The processor 920 may load a command set or data, which is received from other components (e.g., the sensor module 976 or the communication module 1090), into a volatile memory 932, may process the loaded command or data, and may store result data into a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which operates independently from the main processor 921, additionally or alternatively uses less power than the main processor 921, or is specified to a designated function. In this case, the auxiliary processor 923 may operate separately from the main processor 921 or embedded.

In this case, the auxiliary processor 923 may control, for example, at least some of functions or states associated with at least one component (e.g., the display device 960, the sensor module 976, or the communication module 990) among the components of the electronic device 901 instead of the main processor 921 while the main processor 921 is in an inactive (e.g., sleep) state or together with the main processor 921 while the main processor 921 is in an active (e.g., an application execution) state. According to an embodiment, the auxiliary processor 923 (e.g., the image signal processor or the communication processor) may be implemented as a part of another component (e.g., the camera module 980 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to commands associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may be a device for receiving a command or data, which is used for a component (e.g., the processor 920) of the electronic device 901, from an outside (e.g., a user) of the electronic device 901 and may include, for example, a microphone, a mouse, or a keyboard.

The sound output device 955 may be a device for outputting a sound signal to the outside of the electronic device 901 and may include, for example, a speaker used for general purposes, such as multimedia play or recordings play, and a receiver used only for receiving calls. According to an embodiment, the receiver and the speaker may be either integrally or separately implemented.

The display device 960 may be a device for visually presenting information to the user of the electronic device 901 and may include, for example, a display, a hologram device, or a projector and a control circuit for controlling a corresponding device. According to an embodiment, the display device 960 may include a touch circuitry or a pressure sensor for measuring an intensity of pressure on the touch.

The audio module 970 may convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may support a designated protocol wired or wirelessly connected to the external electronic device (e.g., the electronic device 902). According to an embodiment, the interface 977 may include, for example, an HDMI (high-definition multimedia interface), a USB (universal serial bus) interface, an SD card interface, or an audio interface.

A connecting terminal 978 may include a connector that physically connects the electronic device 901 to the external electronic device (e.g., the electronic device 902), for example, an HDMI connector, a USB connector, an SD card connector, or an audio connector (e.g., a headphone connector).

The haptic module 979 may convert an electrical signal to a mechanical stimulation (e.g., vibration or movement) or an electrical stimulation perceived by the user through tactile or kinesthetic sensations. The haptic module 979 may include, for example, a motor, a piezoelectric element, or an electric stimulator.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a GNSS (global navigation satellite system) communication module) or a wired communication module 994 (e.g., an LAN (local area network) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may include one or more antennas to transmit or receive the signal or power to or from an external source. According to an embodiment, the communication module 990 (e.g., the wireless communication module 992) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

According to one embodiment, an electronic device may include a communication circuit to communicate with at least one wearable device, and at least one processor electrically connected with the communication circuit. The at least one processor may be configured to obtain position information on a position on which the at least one wearable device is placed on a user's body, and to transmit a control signal to the at least one wearable device through the communication circuit such that, when an output of a haptic pattern specified based on a function is requested, the at least one wearable device outputs a haptic feedback corresponding to the position information and the specified haptic pattern.

According to one embodiment, the at least one processor may be configured to obtain vibration characteristic information of the at least one wearable device, and to generate the control signal based on the vibration characteristic information, in addition to the position information and the specified haptic pattern.

According to one embodiment, the electronic device may further include a memory to store information for changing the specified haptic pattern based on the vibration characteristic information. The at least one processor may be configured to generate the control signal by using the information for changing the specified haptic pattern.

According to one embodiment, the at least one processor may be configured to receive, through the communication circuit, information for changing the specified haptic pattern based on the vibration characteristic information, and to generate the control signal by using the received information for changing the specified haptic pattern.

According to one embodiment, the at least one processor may be configured to obtain the position information based on movement information of the at least one wearable device.

According to one embodiment, the at least one processor may be configured to output a screen for inducing movement of the at least one wearable device through a display of the electronic device or a display of the at least one wearable device.

According to one embodiment, the at least one processor may be configured to obtain the position information based on a user input.

According to one embodiment, the at least one processor may be configured to output a user interface screen for obtaining the user input through a display of the electronic device or a display of the at least one wearable device.

According to one embodiment, the at least one processor may be configured to obtain the position information based on information on a type of the at least one wearable device.

According to one embodiment, the at least one processor may be configured to change the specified haptic pattern based on at least one of the position information and the vibration characteristic information, and the control signal corresponds to the changed haptic pattern such that the at least one wearable device outputs a haptic feedback corresponding to the changed haptic pattern.

According to one embodiment, wherein the at least one processor may be configured to output a list of wearable devices including the at least one wearable device through a display of the electronic device or a display of the at least one wearable device, and to obtain position information of the at least one wearable device when the at least one wearable device is selected from the list.

According to one embodiment, the at least one wearable device may include a first device and a second device. The communication circuit may be configured to form a first communication channel with the first device, and to form a second communication channel with the second device. The at least one processor may be configured to obtain first position information on a first position on which the first device is placed on the user's body, and second position information on a second position on which the second device is placed on the user's body, to transmit a first control signal to the first device through the first communication channel such that the first device outputs a first haptic feedback corresponding to the obtained first position information of the first device and the specified haptic pattern, and to transmit a second control signal to the second device through the second communication channel such that the second device outputs a second haptic feedback corresponding to the obtained second position information of the second device and the specified haptic pattern.

According to one embodiment, the at least one processor may be configured to obtain first vibration characteristic information of an actuator included in the first device and second vibration characteristic information of an actuator included in the second device. The first control signal may be generated based on the first position information, the specified haptic pattern, and the first vibration characteristic information, and the second control signal may be generated based on the second position information, the specified haptic pattern, and the second vibration characteristic information.

According to one embodiment, the specified haptic pattern may include a position list for where the haptic feedback is to occur. The control signal may be transmitted to the at least one wearable device when the position information corresponds to a position in the position list.

According to one embodiment, a method performed by an electronic device may include identifying at least one wearable device connected with the electronic device, obtaining position information on a position on which the at least one wearable device is placed on a user's body, and transmitting a control signal to the at least one wearable device such that, when an output of a haptic pattern specified based on a function is requested, the at least one wearable device outputs a haptic feedback corresponding to the position information and the specified haptic pattern.

According to one embodiment, the method may further include obtaining vibration characteristic information of an actuator included in the at least one wearable device. The control signal may be generated based on the position, the specified haptic pattern, and the vibration characteristic information.

According to one embodiment, the method may further include, when the at least one wearable device connected with the electronic device includes a plurality of wearable devices, transmitting the control signal through communication channels formed between the plurality of wearable devices and the electronic device.

According to one embodiment, the method may further include outputting an interface for inducing movement of the at least one wearable device.

According to one embodiment, the obtaining of the position information may include outputting an interface for displaying a list of wearable devices including the at least one wearable device, and obtaining the position information of the at least one wearable device when the at least one wearable device is selected from the list.

According to one embodiment, the specified haptic pattern may include a position list for where the haptic feedback is to occur, and the control signal may be transmitted to the at least one wearable device when the position information corresponds to a position in the position list.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 940) including an instruction stored in a machine-readable storage media (e.g., an internal memory 936 or an external memory 938) readable by a machine (e.g., a computer). The machine may be a device that calls the instruction from the machine-readable storage media and operates depending on the called instruction and may include the electronic device (e.g., the electronic device 901). When the instruction is executed by the processor (e.g., the processor 920), the processor may perform a function corresponding to the instruction directly or using other components under the control of the processor. The instruction may include a code made by a compiler or a code executable by an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Having described different embodiments of an electronic device that can dynamically change the specified haptic pattern to take into account the positions and/or vibration characteristics of the wearable devices serving as haptic feedback output devices, it should be apparent to those skilled in the art that certain advantages of the system have been achieved to improve the provision of haptic feedback to the user.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   a communication circuit configured to communicate with at least one wearable device; and
   at least one processor electrically connected with the communication circuit,
   wherein the at least one processor is configured to:
      obtain position information on a position on which the at least one wearable device is placed on a user's body based on movement information of the at least one wearable device; and
      transmit a control signal to the at least one wearable device through the communication circuit such that, when an output of a haptic pattern specified based on a function is requested, the at least one wearable device outputs a haptic feedback corresponding to the position information and the specified haptic pattern.

2. The electronic device of claim 1, wherein the movement information of the at least one wearable device includes a direction in which the at least one wearable device moves.

3. The electronic device of claim 1, wherein the at least one processor is further configured to:
   compare movement data corresponding to a body part wearing the at least one wearable device and a wearing direction with the movement information of the at least one wearable device.

4. The electronic device of claim 1, wherein the at least one processor is further configured to:
   obtain the position information based on a combination of biometric information and the movement information.

5. The electronic device of claim 1, wherein the at least one processor is further configured to:
   output a screen for inducing movement of the at least one wearable device through a display of the electronic device or a display of the at least one wearable device.

6. The electronic device of claim 5, wherein the at least one processor is further configured to:
   based on a selection of the at least one wearable device from a list of the screen, display a pop-up message inducing the movement of the at least one wearable device.

7. The electronic device of claim 1, wherein the at least one processor is further configured to:
   output an audio signal for inducing movement of the at least one wearable device.

8. The electronic device of claim 1, wherein the specified haptic pattern includes a position list for where the haptic feedback is to occur, and
   wherein the control signal is transmitted to the at least one wearable device when the position information corresponds to a position in the position list.

9. The electronic device of claim 8, wherein the position list includes a plurality of target positions for producing a haptic effect, and
   wherein the at least one processor is further configured to select the at least one wearable device based on a particular target position in the position list.

10. An electronic device comprising:
    a communication circuit configured to communicate with at least one wearable device; and
    at least one processor electrically connected with the communication circuit,
    wherein the at least one processor is configured to:
       obtain vibration characteristic information of the at least one wearable device;
       generate a control signal based on the vibration characteristic information; and
       transmit the control signal to the at least one wearable device through the communication circuit such that, when an output of a haptic pattern specified based on a function is requested, the at least one wearable device outputs a haptic feedback corresponding to the specified haptic pattern and the vibration characteristic information.

11. The electronic device of claim 10, wherein the vibration characteristic information includes information on types of haptic pattern outputted by an actuator of the at least one wearable device.

12. The electronic device of claim 11, wherein the vibration characteristic information includes whether the actuator of the at least one wearable device is a linear resonance actuator (LRA), an eccentric rotating mass (ERM) vibration motor, or a DC motor.

13. The electronic device of claim 10, further comprising:
    a memory configured to store information for changing the specified haptic pattern based on the vibration characteristic information,
    wherein the at least one processor is further configured to:
       generate the control signal by using the information for changing the specified haptic pattern.

14. The electronic device of claim 10, wherein the at least one processor is further configured to:
    receive, through the communication circuit, information for changing the specified haptic pattern based on the vibration characteristic information, and
    generate the control signal by using the received information for changing the specified haptic pattern.

15. The electronic device of claim 10, wherein the at least one processor is further configured to:
    change the specified haptic pattern based on at least one of position information and the vibration characteristic information, the position information indicating a position on which the at least one wearable device is placed on a user's body,
    wherein the control signal corresponds to the changed haptic pattern such that the at least one wearable device outputs a haptic feedback corresponding to the changed haptic pattern.

16. A method performed by an electronic device, the method comprising:
    identifying at least one wearable device connected with the electronic device;
    obtaining position information on a position on which the at least one wearable device is placed on a user's body based on movement information of the at least one wearable device; and
    transmitting a control signal to the at least one wearable device such that, when an output of a haptic pattern specified based on a function is requested, the at least one wearable device outputs a haptic feedback corresponding to the position information and the specified haptic pattern.

17. The method of claim 16, wherein the movement information of the at least one wearable device includes a direction in which the at least one wearable device moves.

18. The method of claim 16, further comprising:
    comparing movement data corresponding to a body part wearing the at least one wearable device and a wearing direction with the movement information of the at least one wearable device.

19. The method of claim 16, further comprising:
obtaining the position information based on a combination of biometric information and the movement information.

20. The method of claim 16, further comprising:
outputting a screen for inducing movement of the at least one wearable device through a display of the electronic device or a display of the at least one wearable device.

* * * * *